(12) United States Patent
Barker et al.

(10) Patent No.: US 8,647,436 B2
(45) Date of Patent: Feb. 11, 2014

(54) CARBON ION BEAM GROWTH OF ISOTOPICALLY-ENRICHED GRAPHENE AND ISOTOPE-JUNCTIONS

(75) Inventors: Delmar L. Barker, Tucson, AZ (US); William R. Owens, Tucson, AZ (US); John Warren Beck, Tucson, AZ (US)

(73) Assignees: Raytheon Company, Waltham, MA (US); The Arizona Board of Regents, Tucson, AZ (US)

( * ) Notice: Subject to any disclaimer, the term of this patent is extended or adjusted under 35 U.S.C. 154(b) by 775 days.

(21) Appl. No.: 12/908,852

(22) Filed: Oct. 20, 2010

(65) Prior Publication Data

US 2011/0031104 A1 Feb. 10, 2011

Related U.S. Application Data

(63) Continuation-in-part of application No. 12/061,317, filed on Apr. 2, 2008, now Pat. No. 7,883,580, and a continuation-in-part of application No. 12/139,685, filed on Jun. 16, 2008, now Pat. No. 8,252,115.

(51) Int. Cl.
*C30B 29/02* (2006.01)

(52) U.S. Cl.
USPC ........... 117/109; 117/106; 117/108; 117/929; 117/905

(58) Field of Classification Search
USPC ........... 423/445; 117/106, 108, 109, 905, 929
See application file for complete search history.

(56) References Cited

U.S. PATENT DOCUMENTS

| | | |
|---|---|---|
| 2004/0101685 A1 | 5/2004 | Fan et al. |
| 2005/0191417 A1 | 9/2005 | Fan et al. |
| 2005/0276742 A1 | 12/2005 | Fan et al. |
| 2006/0257566 A1 | 11/2006 | Fan et al. |
| 2007/0187694 A1 | 8/2007 | Pfeiffer |
| 2008/0026168 A1 | 1/2008 | Fan et al. |
| 2009/0252886 A1 | 10/2009 | Barker et al. |
| 2009/0252887 A1 | 10/2009 | Barker et al. |
| 2012/0003438 A1* | 1/2012 | Appleton et al. .......... 428/195.1 |

FOREIGN PATENT DOCUMENTS

CN 1696057 A 11/2005

OTHER PUBLICATIONS

Dong et al, "Ultra-large single-layer graphene obtained from solution chemical reduction and its electrical properties," www.rsc.org/pccp, Physical Chemistry Chemical Physics, 2010, 12, 2164-2169.
Lee et al, "Wafer-Scale Synthesis and Transfer of Graphene Films," American Chemical Society, Nano Letters 2010, 10, 490-493.
Coraux et al., "Structural Coherency of Graphene on Ir(111)," America Chemical Societ, Nano Letters, 2008 vol. 8, No. 2, 565-570.
Choucair et al, "Gram-scale production of graphene based on solvothermal synthesis and sonication," Nature Nanotechnology, vol. 4, Jan. 2009, 30-33.

(Continued)

*Primary Examiner* — Bob M Kunemund
(74) *Attorney, Agent, or Firm* — Eric A. Gifford (57) ABSTRACT

Isotopically-enriched graphene and isotope junctions are epitaxially grown on a catalyst substrate using a focused carbon ion beam technique. The focused carbon ion beam is filtered to pass substantially a single ion species including a single desired carbon isotope. The ion beam and filtering together provide a means to selectively isotopically-enrich the epitaxially-grown graphene from given carbon precursor and to selectively deposit graphene enriched with different carbon isotopes in different regions.

20 Claims, 11 Drawing Sheets

(56) References Cited

OTHER PUBLICATIONS

Subrahmanyam et al. "A study of graphenes prepared by different methods: characterization, properties and solubilization," Journal of Materials Chemistry, 2008, 18, 1517-1523.
Boukhvalov et al, "A new route towards uniformly functionalized single-layer graphene," Journal of Physics D: Applied Physics, 1-4, 2010.
Wang et al, "Small cluster ions from source of negative ions by cesium sputtering," Nuclear Instruments and Methods in Physics Research B 196 (2002) 198-204.
Kuemmeth et al., "Carbon nanotubes for coherent spintronic devices," Department of Physics, Harvard University, Cambridge, Massachusetts 02138, USA, 1-17.
Shiomi et al, "Heat conduction of single-walled carbon nanotube isotope superlattice structures: A molecular dynamics study," Physical Review B 74, 155401, 2006, 1-6.
Xuesong et al, "Large-Area Synthesis of High-Quality and Uniform Graphene Films on Copper Foils," Science, Jun. 5, 2009 vol. 324, 1312-1314.
Garcia et al, "Multilayer graphene films grown by molecular beam deposition," Solid State Communications 150 (2010) 809-811.
Garcia et al., "Multilayer graphene growth on Ni by Molecular Beam Epitaxy," http://www.scitopics.com/Multilayer_graphene_growth_on_Ni_by_Molecular_Beam_Epit . . . Jun. 28, 2010, 1-4.
Gillen et al., "Negative cesium sputter ion source for generating cluster primary ion beams for secondary ion mass spectrometry analysis," American Vacuum Society, J. Vac. Sci. Technol. vol. 19, No. 2, Mar./Apr. 2001, 568-575.
Li et al, "Evolution of Graphene Growth on Ni and Cu by Carbon Isotope Labeling," American Chemical Society, Nano Letters, 2009, vol. 9, No. 12, 4268-4272.
Xiang et al, Vertically Aligned 13C Single-Walled Carbon Nanotubes from No-flow Alcohol Chemical Vapor Deposition and their Root Growth Mechanism, Department of Mechanical Engineering, The University of Tokyo 7-3-1 Hongo, Bunkyo-ku, Tokyo 113-8656, Japan, 1-8.
Growth, fabrication and electronic properties of epitaxial graphene, Journees 3N Nationales en Nanosciences et an Nanotechnologies, Partners: I. Néel-Grenoble, IEMN-Lille, CEA-LETI Collaboration: Small System lab, Georgiatech, 2009.
Sha et al., "Silicon nanotubes," Advanced Materials, vol. 14, No. 17, Aug. 29, 2002, 1219-1221.
Fan et al., "Monitoring the growth of carbon nanotubes by carbon isotope labeling," Nanotechnology, ICP, Bristol, GB, vol. 14, No. 10, Oct. 1, 2003, 1118-1123.
Seifert et al., "Tubular structures of silicon," Phys Rev. B., vol. 63, Apr. 21, 2001, 193409-193413.
Perepichka et al., "Silicon nanotubes," Small, vol. 2, No. 1, Nov. 4, 2005, 22-25.
Bangert et al., "Doping of few-layered graphene and carbon nanotubes using ion implantation," Physical Review B 81, 2010, The American Physical Society, 245423-1 through 245423-11.
Daenen et al., "The wonderous world of carbon nanotubes," Eindhoven University of Technology, Feb. 27, 2003, 1-23.
Striemer et al., "Charge-and size-based separation of macromolecules using ultrathin silicon membranes," 2007 Nature Publishing Group, 749-753.
Wang et al, "Catalytic synthesis of carbon nanotubes under ion irradiation," Letters to the Editors, Carbon 43(2005), 447-450.
Babonneau et al., "Morphology of encapsulated iron nanoparticles obtained by co-sputtering and implantation:a GISAXS study, " J. Appl. Cryst. (2000) 33, 437-441.
Adhikari et al., "Ion-implantation-prepared catalyst nanoparticles for growth of carbon nanotubes," Applied Physics Letters 86, 153104 (2005), 86-88.
Kotakoski et al., "B and N implantation into carbon nanotubes: Insight from atomistic simulations," Physical Review B 71, (2005), 205408-1 through 205408-6.
Rodriguez-Manzo et al., In situ nucleation of carbon nanotubes by the injection of carbon atoms into metal particles, Nature Nanotechnology, (vol. 2, May 2007), 307-311.
Ajayan, "Nanotubes from carbon," 1999 American Chemical Society, May 1, 1999, 1787-1799.
Yamamoto et al., "New method of carbon nanotube growth by ion beam irradiation," American Institute of Physics, (1996), 4174-4175.
Kaukonen et al, "Atomic-scale modeling of the ion-beam-induces growth of amorphous carbon," The American Physical Society (2000), 2806-2811.
Tanemura et al., "Synthesis of carbon nanotubes using hydrocarbon ion beams," Advances Materials Research, vols. 11-12 (2006), 547.
Tanemura et al., "Direct growth of single carbon nanofiber onto tip of scanning probe microscopy induced by ion irradiation," Japanese J. of Appl. Phys. vol. 45, No. 3, 2004-2008.
Yang et al., "Ultralow thermal coductivity of isotope-doped silicon nanowires," Nano Letters 2008, vol. 8, No. 1, 276-280.
Hofmann et al., "Ledge-flow-controlled catalyst interface dynamics during Si nanowire growth," Nature Materials, vol. 7, May 2008, 372-375.
Garaj, Slaven et al., "Graphene Synthesis by Ion Implantation," Applied Physics Letters 97, 183103 2010.

* cited by examiner

CARBON ION BEAM GROWTH OF ISOTOPICALLY-ENRICHED GRAPHENE AND ISOTOPE-JUNCTIONS

CROSS-REFERENCE TO RELATED APPLICATIONS

This application claims benefit of priority under 35 U.S.C. 120 as a continuation-in-part of U.S. application Ser. No. 12/061,317 entitled "System and Method for Nanotube Growth via Ion Implantation using a Catalytic Transmembrane" filed on Apr. 2, 2008 now U.S. Pat. No. 7,883,580 and Ser. No. 12/139,685 entitled "System and Method for Growing Nanotubes with a specified isotope composition via ion implantation using a catalytic transmembrane" filed on Jun. 16, 2008 now U.S. Pat. No. 8,252,115, the entire contents of which are incorporated by reference.

BACKGROUND OF THE INVENTION

1. Field of the Invention

This invention relates to the epitaxial growth of graphene, and more particularly to the use of a carbon ion beam to grow isotopically-enriched graphene and isotope-junctions.

2. Description of the Related Art

Graphene is a one-atom-thick planar sheet of $sp^2$-bonded carbon atoms that are densely packed in a honeycomb, hexagonal crystal lattice. Graphene is a basic building block for graphitic materials of all other dimensionalities. Graphene can be wrapped up into 0D fullerenes, rolled into 1D nanotubes or stacked into 3D graphite.

Graphene has rather remarkable properties. Graphene is stable, chemically inert, and crystalline under ambient conditions. It is a semimetal in that its conduction and valence bands just meet at discrete points in the Brillouin zone. An electron in graphene has an effective mass of zero and behaves more like a photon than a conventional massive particle. Finally graphene can carry huge current densities—about $10^8$ $A/cm^2$, roughly two orders of magnitude greater than copper. Graphene is a candidate for replacing silicon as a basis for faster, more powerful electronics. Graphene nanoribbons (GNRs) are essentially single layers of graphene that are cut in a particular pattern to give it certain electrical properties.

The 2010 Nobel Prize in Physics was recently awarded to Andre Geim and Konstantin Novoselov for their research into graphene. Geim and Novoselov discovered that by applying Scotch tape to graphite they could pull off thin flakes that consist of one, several or many layers of graphene. To locate the rare one-layer flakes, they took advantage of an optical effect: if the flakes are deposited on silicon dioxide substrate of just the right thickness, one-layered graphene reveals itself through interference fringes. It's too early to say whether graphene could end up being useful. Exploiting its unusual electronic properties could prove too difficult to pull off in a cost-effective way.

Epitaxy refers to the method of depositing a monocrystalline film on a monocrystalline substrate. The deposited film is denoted as an epitaxial film or epitaxial layer. The term epitaxy comes from the Greek roots epi, meaning "above", and taxis, meaning "in ordered manner". It can be translated "to arrange upon". Epitaxial films may be grown from solid, gaseous or liquid precursors. Because the substrate acts as a seed crystal, the deposited film takes on a lattice structure and orientation identical to those of the substrate. Techniques for epitaxy deposition include but are not limited to Molecular Beam Epitaxy (MBE), Chemical Vapor Deposition (CVD) and plasma assisted CVD.

These epitaxy techniques have been used to a create single or a few sheets of graphene. A substrate is provided that includes a single crystal region on the surface of the substrate. This region has a honeycomb, hexagonal crystal lattice substantially lattice-matched to graphene. Carbon atoms are deposited at the vertices of three adjacent atoms in the substrate. The distance between these vertices is approximately the bond length of graphene.

Graphene sheets have been epitaxially grown using both natural and enriched-carbon precursors. Natural carbon comprises a mixture of approximately 99% 12C, 1% and 13C and trace amounts of 14C. Natural carbon may be enriched to, for example, include any desired amount of 13C, up to 99.9% given enough time and money. Epitaxially-grown graphene sheets using conventional methods mirror the isotopic composition of the precursor and may often include other non-carbon contaminants from the precursor in the graphene lattice.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a cost-effective technique for epitaxial growth of isotopically-enriched graphene and isotope junctions formed from regions of isotopically-enriched graphene. This techniques provides a means to selectively isotopically-enrich the epitaxially-grown graphene from given carbon precursor and to selectively deposit graphene enriched with different carbon isotopes on different regions.

This is accomplished with a source that generates a carbon ion beam. The source includes a carbon precursor (natural or enriched), means for generating carbon-based ion species from the precursor and means for focusing the ions into an ion beam. Each species comprises a different electrically charged carbon isotope or a different electrically charged molecular ion containing one or more carbon isotopes. A filter selects a component ion beam substantially comprised of a desired ion species containing a single carbon isotope and directs that ion beam onto a catalyst substrate to epitaxially grow isotopically-enriched graphene on the surface of the single crystal region of the substrate from the desired carbon isotope. The graphene may be directly grown on the surface, indirectly grown through a process of implantation, diffusion and exsolution or using a hybride direct-indirect process. The filter may be controlled to select different ion species to grow different isotopically-enriched graphene regions that form an isotope junction. The isotope junction may be a planar isotope junction formed within a single graphene sheet or a vertical isotope junction formed between graphene sheets.

In an embodiment, a method of making isotopically enriched graphene, comprises providing a catalyst substrate including a single crystal region on a surface of the substrate in which the region has a hexagonal crystal lattice substantially lattice-matched to graphene. A carbon ion beam source including a carbon precursor and a focusing aperture generates a focused ion beam that is directed towards the substrate.

The beam comprises a plurality of ion species, each species comprising a different electrically charged carbon isotope or a different electrically charged molecular ion containing one or more carbon isotopes. The ion beam is accelerated with an electric field towards the substrate. Magnetic or electric field generating devices are controlled to separate the ion beam into a plurality of component ion beams according to the charge-to-mass ratio of the different ion species. The devices are controlled to pass a selected component ion beam substantially comprised of a single ion species containing a single desired carbon isotope or molecular ion containing a single desired carbon isotope toward the substrate and to filter out the remaining component ion beams containing undesired ion species. The selected component ion beam is directed onto the substrate to epitaxially grow isotopically-enriched graphene on the surface of the single crystal region of the substrate from the desired carbon isotope.

In another embodiment, first and second selected component ion beams each substantially comprised of different first and second carbon isotopes are directed toward the substrate to grow first and second regions of isotopically-enriched graphene that form an isotope junction between the different first and second carbon isotopes in one or more graphene sheets. The isotope junction may be formed in a single graphene sheet or between multiple graphene sheets. The magnetic or electric field generating devices may be controlled to switch the ion species selected from a single common ion beam to create the isotope junction. Alternately, separate ion sources may be provided and the devices fixed to select different ion species. The pair of isotopically-enriched sources may then be switched to create the isotope junction.

These and other features and advantages of the invention will be apparent to those skilled in the art from the following detailed description of preferred embodiments, taken together with the accompanying drawings, in which:

DETAILED DESCRIPTION OF THE INVENTION

Figure 1A:
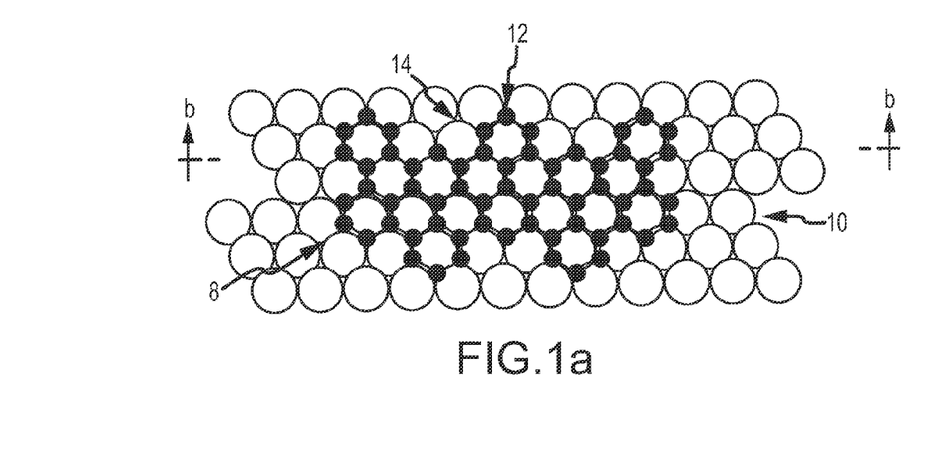
FIGS. 1a and 1b are plan and section views of an isotopically-enriched graphene sheet formed on a catalytic substrate.
Figure 1B:
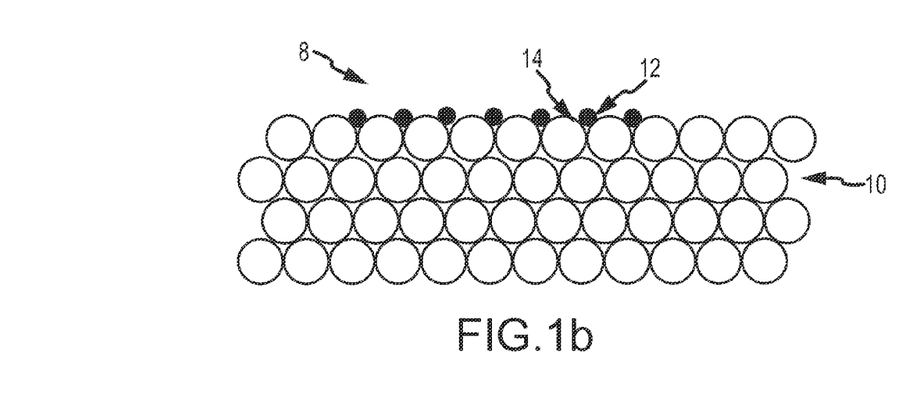

As shown in FIGS. 1a and 1b, epitaxy may be used to create a single or few sheets of graphene 8. A substrate 10 is provided that includes a single crystal region on the surface of the substrate. This region has a honeycomb, hexagonal crystal lattice substantially lattice-matched to graphene. Typical substrates include Silicon-Carbide (SiC) and elements from the periodic table including iron to copper, ruthenium to rhodium and rhenium to iridium and mixtures thereof and various multi element structures such as Al2O3 and alloys of the above to approximate the symmetry and lattice constants of graphene. Carbon atoms 12 from a carbon precursor (e.g. a solid target, gas or liquid) are deposited at the vertices of three adjacent atoms 14 in the substrate. The distance between these vertices is approximately the lattice constant of graphene. The planar sheet of $sp^2$-bonded carbon atoms 14 that are densely packed in a honeycomb, hexagonal crystal lattice define graphene 8.

For many research and potential commercial applications of graphene the naturally occurring isotope composition of carbon is perfectly adequate. However, for other applications it may be desirable to grow graphene regions or sheets that are isotopically-enriched without the time and expense of enriching the carbon precursor directly. For example, one may wish to grow 12C graphene with a purity of 99.9% instead of 99%. Or one may wish to grow 13C graphene at higher concentrations than the 1% that occurs naturally e.g. greater than 50%, 80%, 90%, 95%, 99% or event 99.9%. Furthermore, it may be desirable to reduce or eliminate non-carbon atoms from the precursor that take the place for carbon atoms in the lattice, the contaminants also reduce the purity of the graphene.

Figure 2:
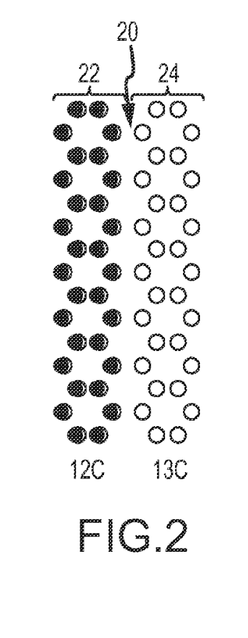
FIG. 2 is a diagram of a carbon isotope junction formed in or between graphene sheets.

In certain applications it may be desirable create isotope-junctions 20; a sudden transition from a region 22 formed from one carbon isotope (e.g. 12C) to another region 24 form from a different carbon isotope (e.g. 13C), within or between graphene sheets as shown in FIG. 2. To create such isotope-junctions requires the capability to make isotopically-enriched graphene regions and the capability to switch the carbon isotope and to control the geometry.

To date, no one has proposed a modification to the known techniques of MBE, CVD and plasma assisted CVD that would facilitate the growth of isotopically-enriched graphene (without enriching the carbon precursor itself at great expense). Furthermore, no one has suggested forming isotope-junctions from different carbon isotopes with graphene, either within a graphene sheet or between graphene sheets, and particularly no one has suggested a technique to form such isotope-junctions.

The present incorporates methods for carbon isotope selection in concert with epitaxial graphene growth as a means to make graphene of high isotope purity, or alternatively, graphene junctions comprised of regions with different carbon isotopes. There are many rationales for wanting to manufacture graphene-based devices of a single carbon isotope, or devices containing carbon isotope junctions. Examples of such applications include devices that can regulate conduction electron transport using interactions with $^{13}C$ nuclear spins. Another example is a class of thermoelectric devices with enhanced thermoelectric figure of merit brought about by phonon scattering in an isotope superlattice, without impeding electron transport.

The present invention describes a cost-effective technique for epitaxial growth of isotopically-enriched graphene and isotope junctions formed from regions of isotopically-enriched graphene. This technique provides a means to selectively isotopically-enrich the epitaxially-grown graphene from given carbon precursor and to selectively deposit graphene enriched with different carbon isotopes on different regions. This is achieved by generating a focused carbon ion beam that contains multiple ion species including the desired carbon isotope(s). The ion beam is filtered using electric or magnetic devices that separate the beam by ion species and direct the desired ion species to the substrate to grow the isotopically-enriched graphene. The devices may be controlled to select a different ion species and carbon isotope to form an isotope-junction.

Figure 3:
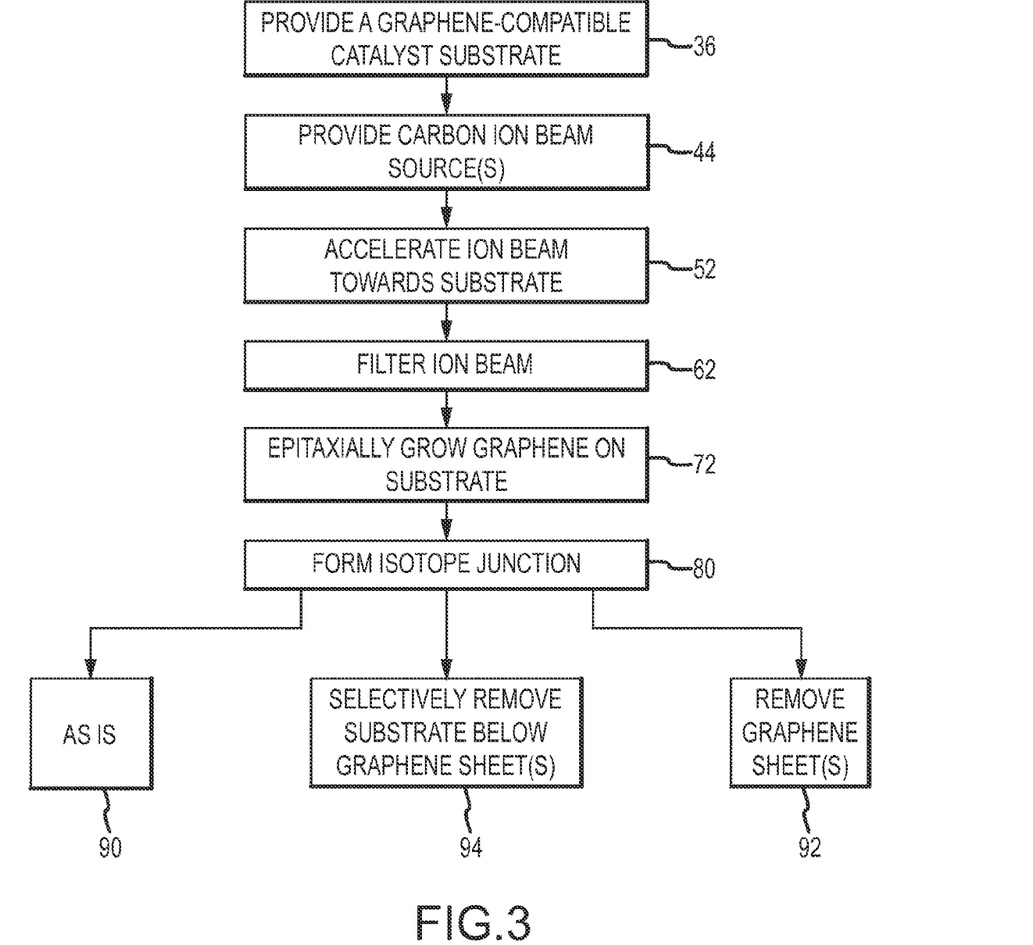
FIG. 3 is a flow diagram for carbon ion beam growth of isotopically-enriched graphene and isotope junctions.
Figure 4:
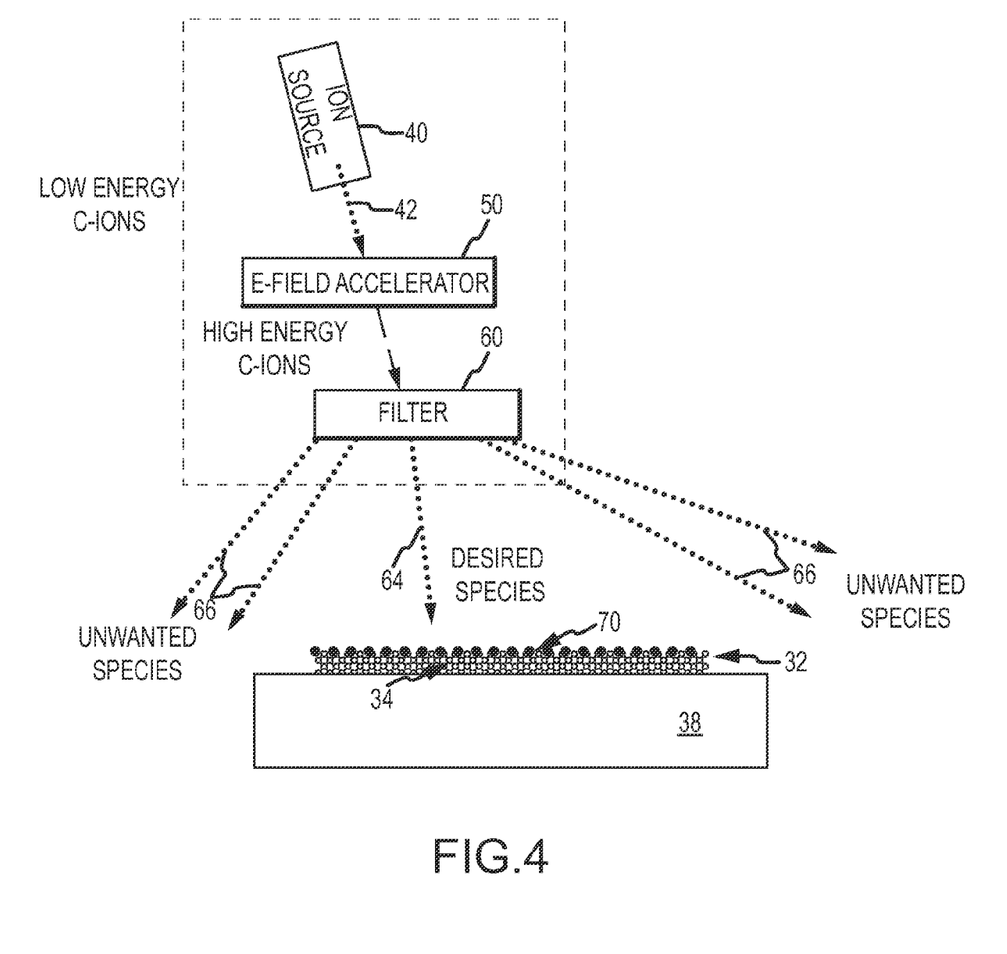
FIG. 4 is a diagram for carbon ion beam growth of isotopically-enriched graphene.

As shown in FIGS. 3 and 4, an embodiment of a focused carbon ion beam (FCIB) technique for epitaxially growing isotopically enriched graphene comprises providing a catalyst substrate 32 such as copper or nickel including a single crystal region 34 on a surface of the substrate in which the region has a hexagonal crystal lattice substantially lattice-matched to graphene (step 36). The substrate 32 is suitably supported on a Si or SiO2 support 38.

The technique uses a carbon ion beam source 40 to generate a focused carbon ion beam 42 (step 44). Source 40 includes a carbon precursor (e.g. a solid graphite target or a gas), means for generating carbon-based ion species from the precursor and means such as magnetic or electrostatic lenses and a focusing aperture for forming the ion species into the focused carbon ion beam 42. To define a "beam", the different ion species all have the same type of charge, positive or negative, are all travelling in the same direction at approximately the same speed in a defined shape. The beam comprises a plurality of ion species, each species comprising a different electrically charged carbon isotope or a different electrically charged molecular ion containing one or more carbon isotopes. For example, a source may use cesium sputter ion source to sputter a solid graphite target and produce ion species of 12C—, 13C—, 12CH—, 13CH—, 12C13C—, 12C12C—, 13C13C— 12CH2-, 12CH4-, and a host of other ions. If there is also a catalyst contamination the target such as iron (Fe), sputtering may also generate Fe- and Fe2-ion species. A different source may use a gas ion source of electron impact design to create ion species from a carbon-based gas. Another source may use a microwave plasma ion source.

An electric field accelerator 50 accelerates the ions in carbon ion beam 42 to a desired energy level (step 52).

The carbon ion beam 42 is passed through an electromagnetic filter 60 that selects a desired ion species from the beam and passes the desired ion species towards the substrate (step 62). Because the carbon isotopes are first ionized and second formed into a beam they can be separated using electric and/or magnetic fields. More particularly, the EM filter comprises magnetic or electric field generating devices that are configured to separate the ion beam into a plurality of component ion beams according to the charge-to-mass ratio of the different ion species. The devices are controlled to pass a selected component ion beam 64 substantially comprised of a single ion species containing a single desired carbon isotope or molecular ion containing a single desired carbon isotope toward the substrate and to filter out the remaining component ion beams 66 containing undesired ion species. It is possible that small amounts of undesired ion species may pass through the filter and to the substrate. For example, if the filter is configured to pass 13C, the ion species 12CH— has the same charge-to-mass ratio and will also pass. To reduce or eliminate these undesired species, the ion beam may be passed through a low energy collision cell (prior to the filter) containing a gas (e.g. neon) to break the 12CH— molecules into its constituent atoms, which are then rejected by the filter.

The selected component ion beam 66 is directed onto the substrate 32 to epitaxially grow isotopically-enriched graphene 70 on the surface of the single crystal region 34 of the substrate substantially from the desired carbon isotope (step 72). To be precise, graphene 70 is "isotopically-enriched" in that the percentage of the graphene composition attributable to the desired carbon isotope is higher than the percentage of that same carbon isotope in the carbon precursor. For example, the FCIB technique may be used with a natural carbon precursor of approximately 99% 12C and 1% 13C. The filter may be configured to produce graphene 70 that is 99.9% 12C or 99% 13C.

The selected component ion beam 66 may interact with the substrate in different ways to epitaxially-grow the isotopically-enriched graphene 70. The ion beam may (a) deposit the ions directly on the surface of the substrate, (b) implant the ions into the interior of the substrate where they diffuse to and exsolve from the surface of the substrate or (c) a hybrid approach involving two ions beams with different ion species to either form multiple layers of different ion species on the same or opposing surfaces of the substrate.

The substrate acts as a catalyst that increases the rate of a chemical reaction without being consumed in the reaction itself. Many catalysts are used to change the rate of surface reactions, i.e. reactions that occur on the surface of a substance, as opposed to those that occur in a dispersed media. Less commonly catalysts may work as individual molecules dispersed in the reactants. Catalysts work in a number of ways, such as by arranging the reacting molecules in configurations on the catalyst molecule or surface of the catalyst that more readily react with the other reactants, or by causing a reconfiguration of one or more of the reactants so as to make it more reactive, or by reducing the energy barrier for breaking one or more of the reactants into units that can react with the other reactants. In some cases these smaller reactant components will be ionic species, in other cases they may be neutral. In general ionic species will react far faster with other reactants than neutral reactants.

In the case of epitaxial graphene growth, graphene catalysis apparently occurs only on the surface of the catalyst. For some catalysts, such as Copper, very little carbon dissolves into the copper catalyst particles, the catalysis is strictly a surface facilitated reaction. For a Nickel catalyst, Carbon species may also become implanted into the nickel particles, but will not form graphene until it is diffused to the surface and exsolved from the catalyst particle, i.e. no longer in solution with the nickel. As the carbon atom is exsolved from the nickel, it must first cross the surface of the nickel, where the energy environment is considerably different than in the interior of the nickel. It is unknown whether the carbon is ionic as it is exsolved, or neutral. Graphene can form by attachment of carbon bearing gasses (such as CH4) on the surface of the nickel, but that additional layers of graphene can form beneath the outer layer, as a result of exsolution of carbon from the interior of the nickel grains. The arrangement of atoms on the surface of the catalyst particle is important for formation of graphene. In particular, the arrangement and spacing of atoms on the catalyst should be similar to that of graphene, in order for graphene to grow. This is why a substrate material that is "lattice matched" to graphene is selected. Materials with better lattice matching seem to often be better graphene catalysts.

In another embodiment, first and second selected component ion beams each substantially comprised of different first and second carbon isotopes are directed toward the substrate to grow first and second regions of isotopically-enriched graphene that form an isotope junction between the different first and second carbon isotopes similar to isotope junction 20 shown in FIG. 2 (step 80). The isotope junction may be formed in a single graphene sheet or between multiple graphene sheets. The filter 60 may be controlled to switch the ion species selected from a single common ion beam 42 to create the isotope junction. Alternately, separate ion sources may be provided and their respective filters fixed to select different ion species. The pair of isotopically-enriched sources may then be alternated to create the isotope junction.

Once the graphene has been grown, it may be left 'as is' on the substrate (step 90), peeled off of the substrate (step 92) or the substrate may be selectively etched to either form a graphene 'bridge' in order to isolate the graphene or to allow graphene formed on opposing surfaces of the substrate to collapse together (step 94).

Figure 5:
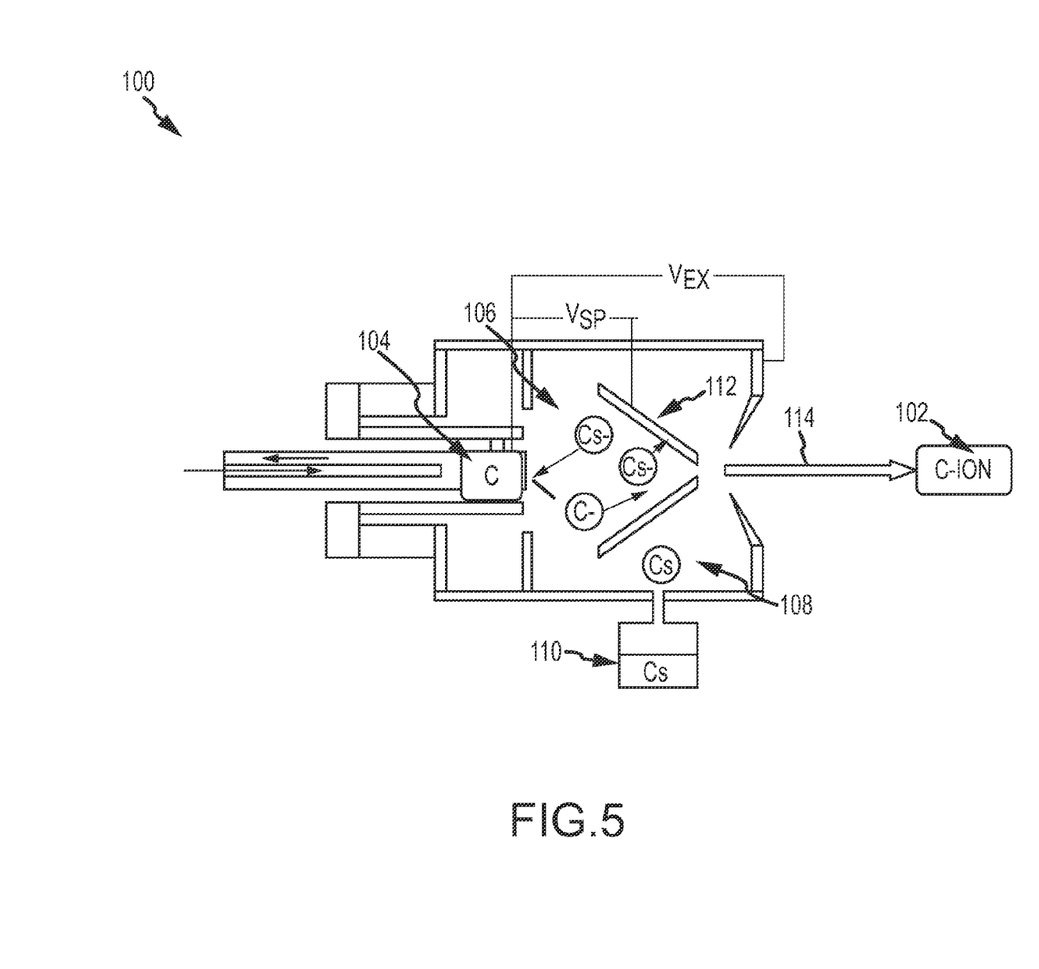
FIG. 5 is a diagram of an embodiment of a carbon ion beam source.

An embodiment of a focused carbon ion beam source 100 is illustrated in FIG. 5. The source releases negatively charged carbon ions 102 from the surface of a carbon source material 104 by sputtering with incident positive Cs ions 106. Cs vapor 108 from the Cs oven 110 is readily ionized at relatively low temperatures by a heated ionizer 112. Positive Cs ions 106 are accelerated toward the carbon source 104 by the sputtering voltage Vsp. Negative carbon ions 102 ejected from the C source are accelerated by the extraction voltage Vex and emerge from the source as a beam 114 of negative carbon ions. Other source designs are possible, but this one exploits the low temperature thermal ionization of Cs and efficiency of sputtering to produce C ions.

The selection filter directs a desired ion species containing a single desired carbon-isotope towards the substrate. A typical filter separates the ion beam into multiple component ion beams according to the charge-to-mass ratios of the different ion species. A controller may reconfigure the selection filter to direct a different component ion beam (different carbon isotope) towards the substrate to form isotope junctions. The filter may be reconfigured to form different regions within a single graphene sheet to form planar isotope junctions or to form different regions in different graphene sheets to form vertical isotope junctions between sheets.

Figure 6:
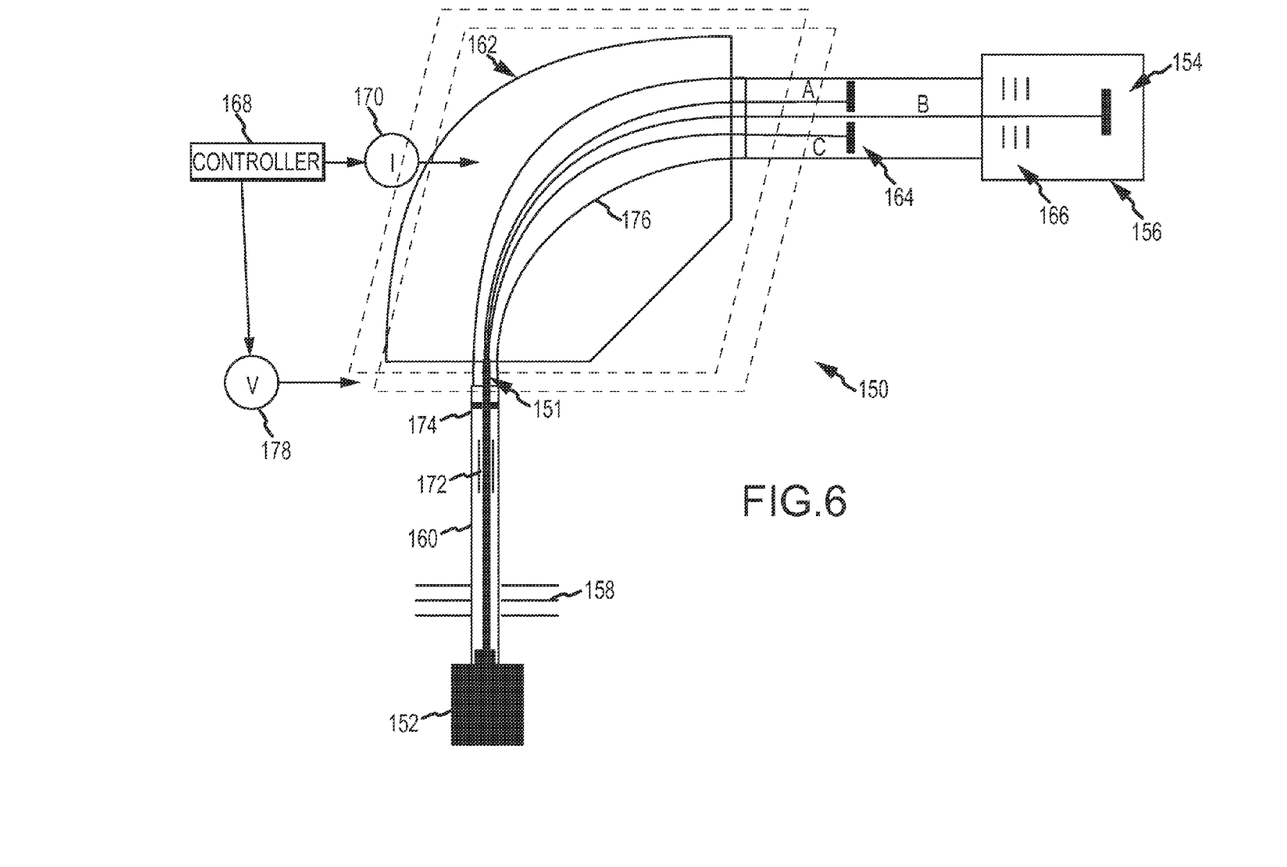
FIG. 6 is a diagram of an embodiment of an electromagnetic filter for separating the carbon ion beam into its constituent components and passing a desired ion species to the catalyst substrate.

In an exemplary embodiment shown in FIG. 6, a selection filter 150 carries a focused carbon ion beam 151 from an ion source 152 and directs a desired ion species onto a substrate 154 in a deposition chamber 156. An electric field ion-acceleration stage 158 provides all of ions the same energy. An evacuated flight tube 160 carries ions from the ion source to an electromagnetic filter 162 that separates ions into component ion beams A, B and C according to charge/mass ratio for equal energy ion species, hence mass for equal charge ions. The desired component beam B passes through a slit 164, through an electric field deceleration stage 166 that reduces ion energy (e.g. into the 0.1 to 10 KeV range) and onto the substrate. The radius of curvature of the component beams moving through the magnetic field is proportional to the square root of the energy and inversely proportional to the magnetic field. In this embodiment, the controller 168 adjusts the amount of current from current source 170 applied to the electromagnetic filter to change the magnetic field and select the desired component ion beam to pass through slit 164 to the substrate. The attainable switching speeds may be relatively slow, on the order of a second or longer, depending on the size of the electromagnetic and current source capabilities of the power supply. Depending upon the structure and growth rates, switching the magnetic field may or may not be acceptable. If the isotope composition is changing frequently and the growth rates are high, faster switching may be needed.

In this embodiment, the selection filter 150 also includes means to switch the primary beam on and off, which may be useful when using multiple ion sources for example, and means to switch the filter more rapidly. A prefilter includes a deflection stage 172 that, when activated, creates an electric field that deflects the ion beam which is blocked by slit 174. The prefilter effectively turns the primary beam on or off. To increase switching speed, an electrostatic bouncer chamber 176 is placed inside the electromagnetic filter. A voltage source 178 applies a voltage across plates 180 to create an electric field around the bouncer chamber to accelerate (or decelerate) the ions during traversal of the chamber. This is the same as changing the energy of the ions while in the chamber. Two ions of the same mass/charge ratio but of different energies will traverse different trajectories while passing through the magnetic field. Thus, by changing the energy of the component ion beams from one state to another, all of the ion beams can be moved back and forth so that only the selected component beam will pass through slit 164. The controller can change the bouncer voltage on the order of microseconds thereby achieving much faster switching times.

The capability to make isotopically-enriched graphene in a cost-effective manner from a natural carbon precursor, to precisely control the placement of the ions in a small area and to rapidly switch the carbon isotope facilitates the creation of isotope-junctions in graphene. Such sharp transitions from one isotope to another, at very high enrichment levels, defines a fundamental building block that may be used for many different applications including mechanical, thermal, optical and electronics. The isotope junctions may be formed in the plane of graphene, between sheets of graphene or a combination of both.

Figure 7:
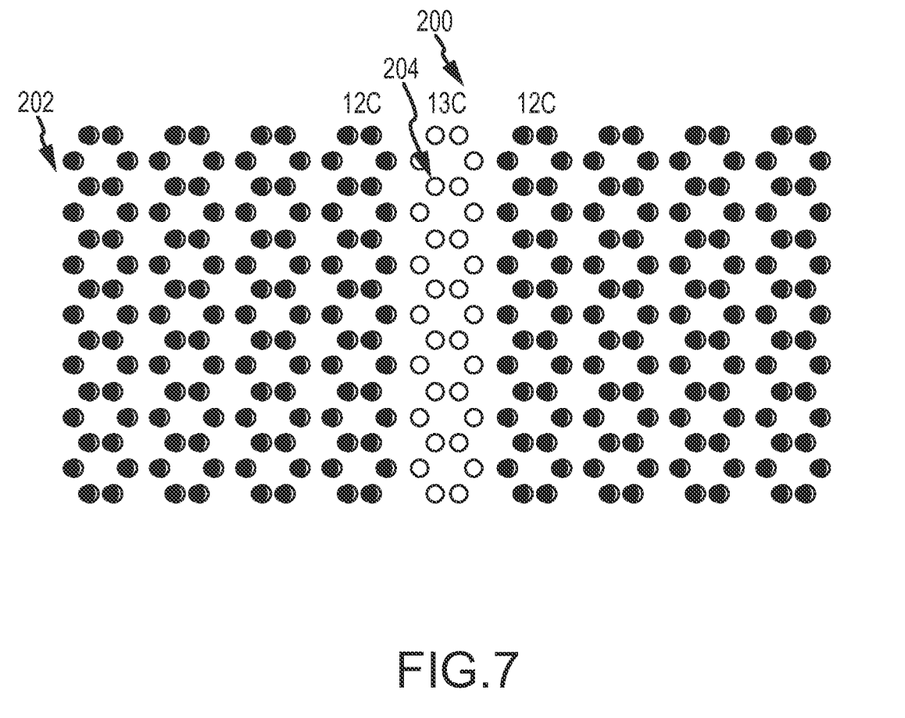
FIG. 7 is a diagram of a planar isotope junction formed within a single graphene sheet.

As shown in FIG. 7, a planar isotope junction 200 is formed within a single sheet of graphene 202. A nanoribbon 204 of isotopically-enriched 13C is formed within the graphene sheet 202 of isotopically-enriched 12C. The width of nanoribbon 204 and the placement of additional nanoribbons may be selected for any specified period of isotope junctions. For example, a natural carbon precursor of approximately 99% 12C and 1% 13C may be used to form an isotope junction of 99.9% 12C and 99.9% 13C. The planar isotope junction 200 may be formed using different permutations of the FCIB technique.

Figure 8A:
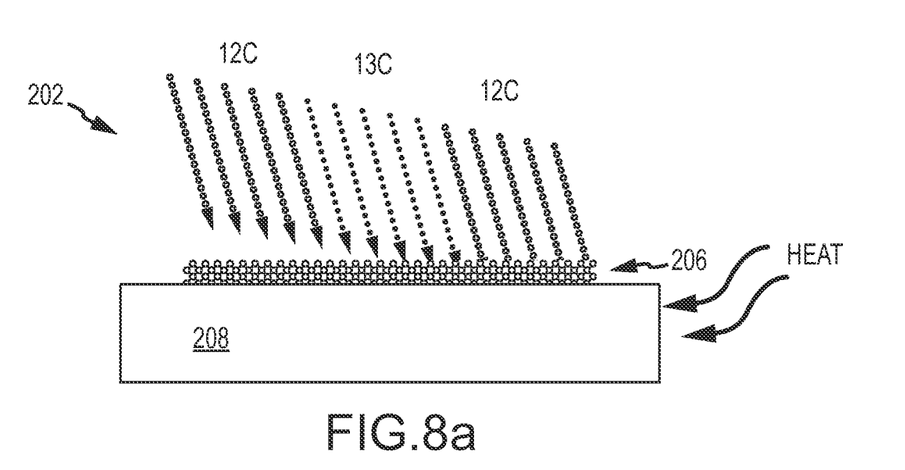
FIGS. 8a-8b are diagrams for raster scanning the ion beam that is filtered to pass different carbon isotopes to epitaxially grow the planar isotope junction.
Figure 8B:
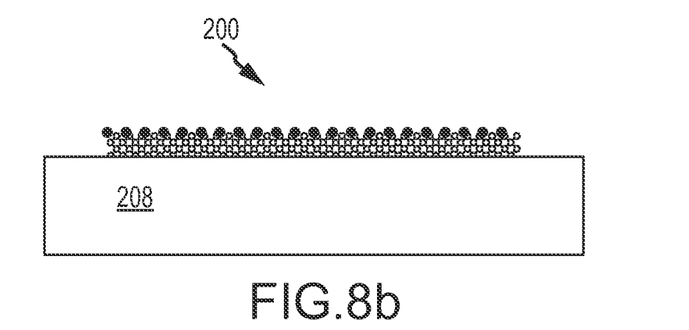

An embodiment for fabricating the planar isotope junction 200 using a common ion beam source and filter is illustrated in FIGS. 8a-8b. In this approach, an ion beam 202 is raster scanned across the surface of a catalyst substrate 206 on a silicon support 208 to deposit the isotopically-enriched carbon ions. The filter is switched in coordination with the raster scan to first pass 12C, then 13C and finally 12C to epitaxially grow the planar isotope junction 200 show in FIG. 7. Because the focused ion beam can be sharply defined and the isotope content rapidly switched, this approach can define very sharp isotope junctions of very small size and well-defined shapes.

The catalyst may be selected (e.g. copper) and the ions accelerated to an energy level such that the ions are deposited directly on the surface of the substrate where they react with the catalyst to directly epitaxially grow the graphene on the surface. The substrate is suitably heated to an elevated temperature during bombardment to overcome the activation energy required for graphitization reactions and to grow the graphene at a faster rate. Typical temperatures for graphitization are approximately 800-1,000 C. Alternately, the catalyst may be selected (e.g. nickel) and the ions accelerated to a higher energy to implant the ions into the interior of the substrate. The ions then diffuse to the surface and exsolve from the surface to epitaxially grow graphene. Heating is not required during implantation but is required during diffusion as the diffusion rate is an exponential function of temperature.

The FCIB technique may be used in other ways to form the planar isotope junction. For example, a graphene sheet of isotopically-enriched 12C may be grown on the substrate. The sheet could than be etched to remove an area for the 13C nanoribbon. The sheet would then be masked to expose only this area and a sheet of isotopically-enriched 13C grown over the mask depositing the nanoribbon of 13C in the exposed area.

Figure 9:
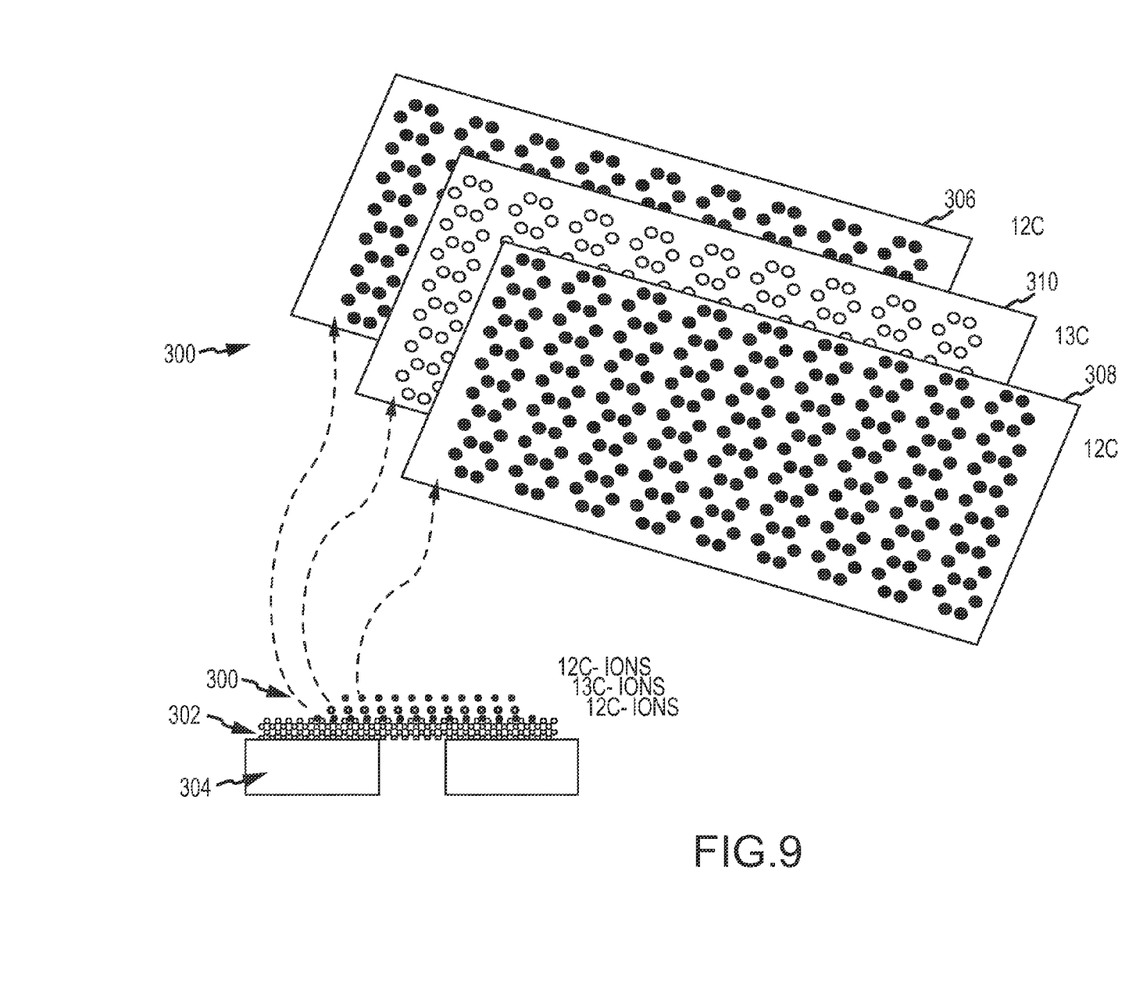
FIG. 9 is a diagram of a vertical isotope junction formed between multiple graphene sheets.
Figure 10A:
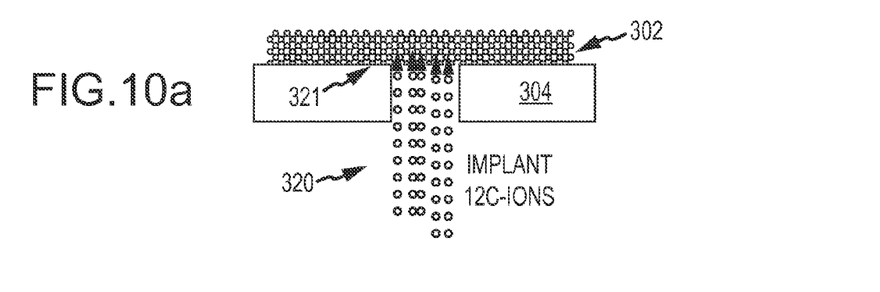
FIGS. 10a-10e are diagrams of an embodiment for implanting 12C and then 13C carbon isotopes from the backside of the catalyst substrate that diffuse and exsolve to form graphene sheets on the top surface that form the vertical isotope-junction.
Figure 10B:
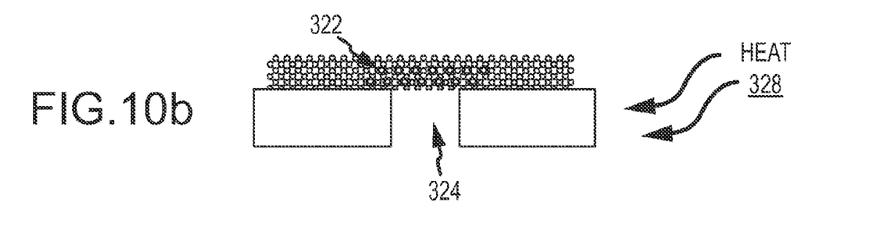
Figure 10C:
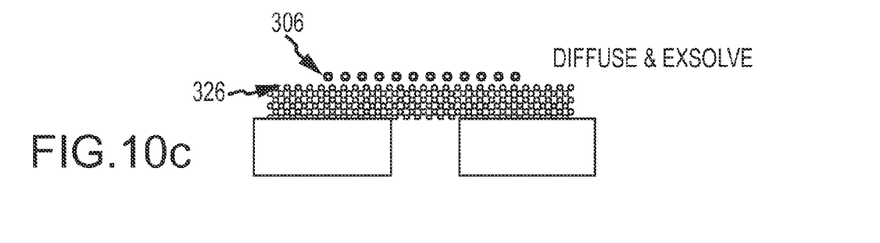
Figure 10D:
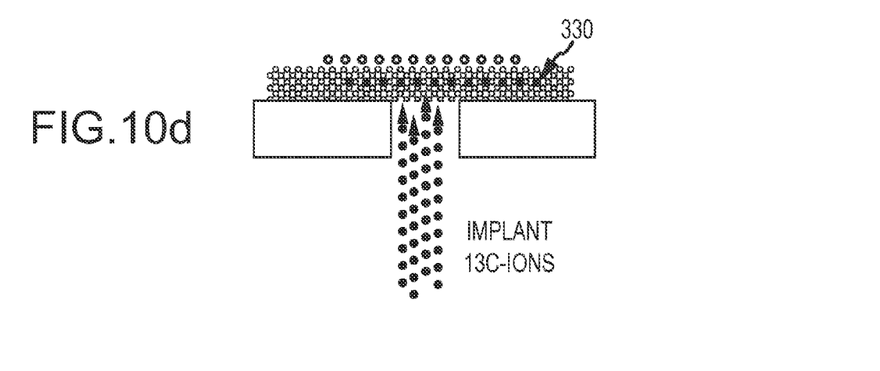
Figure 10E:
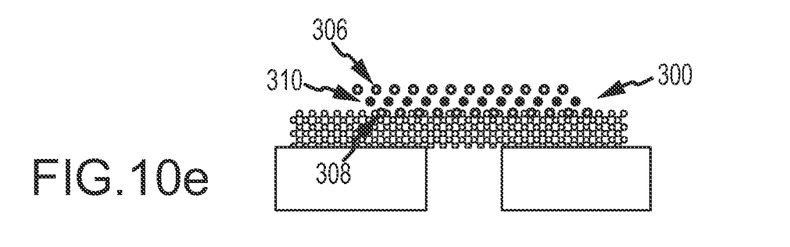

As shown in FIG. 9, a vertical isotope junction 300 is formed between multiple sheets of graphene on a catalyst substrate 302 on support 304. Sheets 306 and 308 of enriched 12C are sandwiched around a sheet 310 of enriched 13C to define the vertical isotope junction 300. The thickness of each isotope and the placement of the enriched sheets may be selected for any specified period of isotope junctions. For example, a natural carbon precursor of approximately 99% 12C and 1% 13C may be used to form an isotope junction of 99.9% 12C and 99.9% 13C. The vertical isotope junction 300 may be formed using different permutations of the FCIB technique using direct or indirect growth and combinations thereof designed, in part, to reduce damage to previous graphene sheets caused by the growth of subsequent graphene sheets.

An embodiment for fabricating the vertical isotope junction 300 using a common ion beam source and filter is illustrated in FIGS. 10a-10e. In this approach, an ion beam 320 is directed through support 304 to the back surface 321 of substrate 302 to implant the selected component ion beam (desired ion species 322) into the interior of the substrate. In this embodiment, support 304 has been etched to define an aperture 324 through which the ion beam is directed. This may be done simply to facilitate implantation of the ions or to define the spatial geometry of the graphene grown on the top surface 326 of the substrate. Multiple apertures could be define in the support to define a specified graphene pattern on the top surface of the substrate. Alternately, the support could be thin enough that the ions penetrate through the support and are implanted at the proper depth in the substrate.

Once the desired ion species 322 is implanted into the substrate, heat 328 is applied to diffuse the carbon isotope in ion species 322 towards the top surface and then exsolve them from the top surface to epitaxially grow a graphene sheet 306 of isotopically-enriched 12C. The filter is switched to pass a selected component ion beam containing an ion species of 13C. The process is repeated to implant 13C ions 330 into the interior of the substrate and then to diffuse and exsolve 13C atoms to form a second graphene sheet 310 of isotopically-enriched 13C and then sheet 308 of isotopically-enriched 12C. Each successive graphene sheet is formed under the previous graphene sheet. The filter may be controlled to generate a specified period of vertical isotope junctions.

Figure 11A:
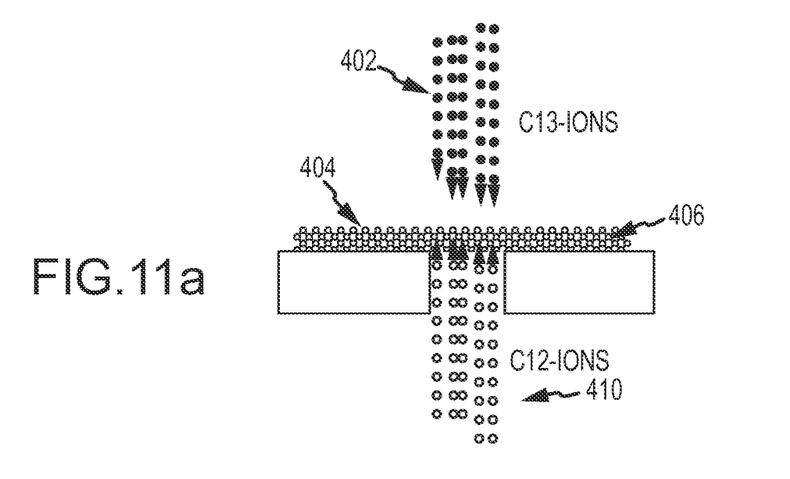
FIGS. 11a-11c are diagrams of a hybrid process of direct and indirect epitaxial growth of different graphene sheets to form the vertical isotope-junction.
Figure 11B:
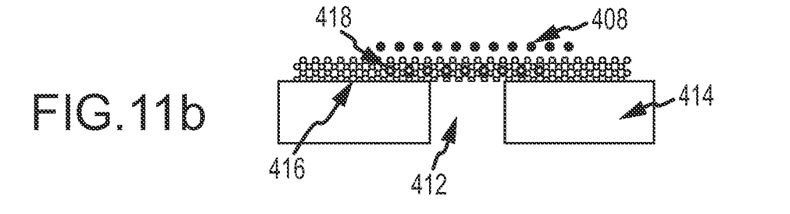
Figure 11C:
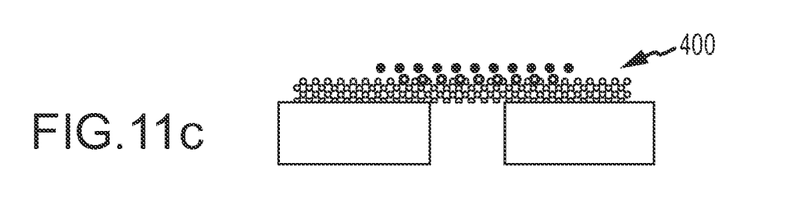

Another embodiment for fabricating a vertical isotope junction 400 using a pair of ion beams and respective filters is illustrated in FIGS. 11a-11c. In this approach, an ion beam is filtered to provide a component ion beam 402 comprised substantially of 13C ions directed at a top surface 404 of a catalyst substrate 406 to directly epitaxially grow isotopically-enriched 13C graphene 408 on the substrate. Thereafter, another ion beam is filtered to provide a component ion beam 410 comprised substantially of 12C ions directed through an aperture 412 in a support 414 to a back surface 416 of substrate 406. The 12C are implanted, diffused and exsolved to the top surface to epitaxially grow isotopically-enriched 12C graphene 418 beneath the isotopically-enriched 13C graphene 408 to define vertical isotope junction 400. The steps may be repeated for either or both the direct growth or implantation and exsolution and the respective filters may be switched to change isotope selection. Instead of using a pair of ion beams and filters, it may be possible to use a single ion beam and filter and to simply direct the selected component beam to either the top or bottom surface.

Isotopically-Enriched Graphene Growth System

Figure 12:
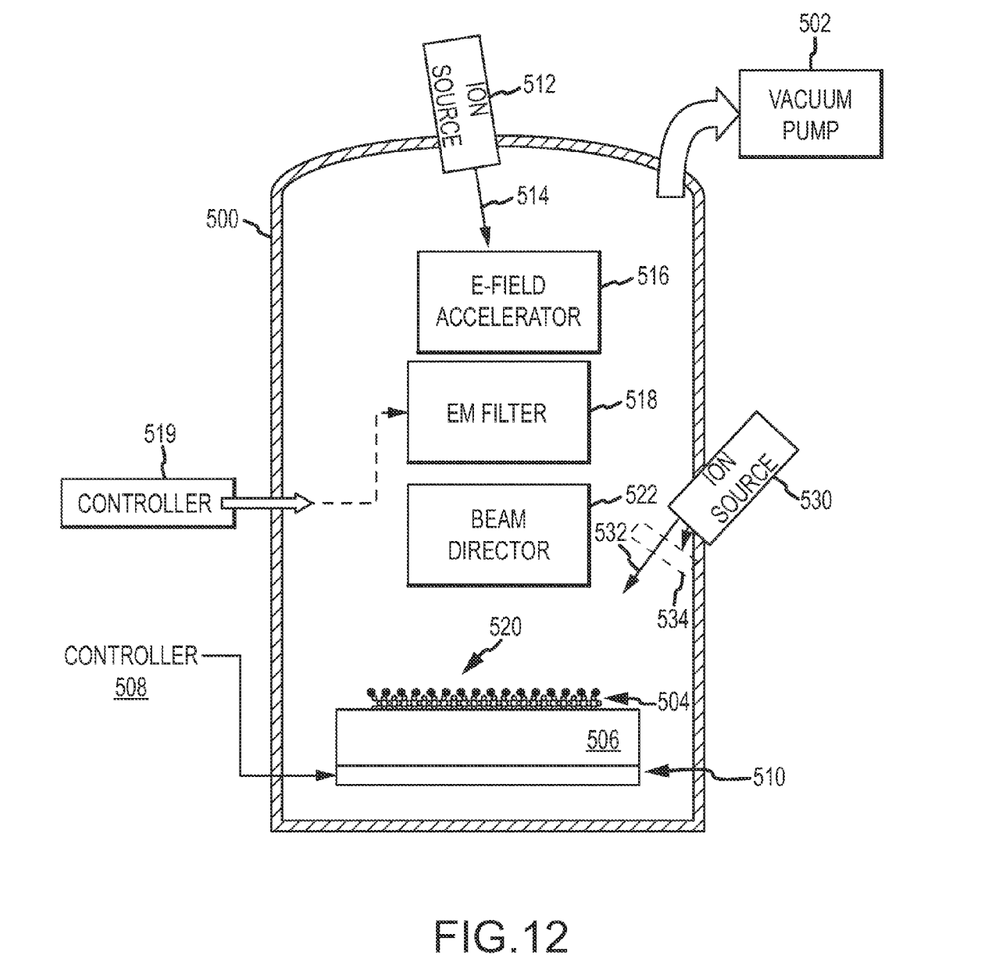
FIG. 12 is an embodiment of a system for carbon ion beam growth of isotopically-enriched graphene and carbon isotope junctions.

A chamber 500 is held at a vacuum level suitable for ion implantation by a vacuum pump 502. A catalyst substrate 504 on a support 506 is placed in the chamber. A controller 508 and substrate heater 510 is coupled to the support to selectively heat the substrate 504. A carbon ion beam source 512 generates a focused carbon ion beam 514. The beam comprises a plurality of ion species, each species comprising a different electrically charged carbon isotope or a different electrically charged molecular ion containing one or more carbon isotopes. For example, a source may use cesium sputter ion source to sputter a solid graphite target and produce ion species of 12C—, 13C—, 12CH—, 13CH—, 12C13C—, 12C12C—, 13C13C— 12CH2-, 12CH4-, and a host of other ions. If there is also a catalyst contamination the target such as iron (Fe), sputtering may also generate Fe- and Fe2-ion species. An electric field accelerator 516 accelerates the ions in carbon ion beam 514 to a desired energy level.

The carbon ion beam 514 is passed through an electromagnetic filter 518 that selects a desired ion species from the beam and passes the desired ion species towards the substrate. Because the carbon isotopes are first ionized and second formed into a beam they can be separated using electric and/or magnetic fields. More particularly, the EM filter comprises magnetic or electric field generating devices that are configured to separate the ion beam into a plurality of component ion beams according to the charge-to-mass ratio of the different ion species. A controller 519 controls the filter to pass a selected component ion beam 520 substantially comprised of a single ion species containing a single desired carbon isotope or molecular ion containing a single desired carbon isotope toward the substrate and to filter out the remaining component ion beams containing undesired ion species. It is possible that small amounts of undesired ion species may pass through the filter and to the substrate. For example, if the filter is configured to pass 13C, the ion species 12CH— has the same charge-to-mass ratio and will also pass. To reduce or eliminate these undesired species, the ion beam may be passed through a low energy collision cell (prior to the filter) containing a gas (e.g. neon) to break the 12CH— molecules into its constituent atoms, which are then rejected by the filter.

A beam director 522 comprised of electric or magnetic field generating devices may be used to direct the selected component ion beam onto the substrate 504 to epitaxially grow isotopically-enriched graphene 522 on the surface. The beam director 522 may be used to place the ions in specific areas on the substrate to, for example, define different regions of a planar isotope junction.

Controller 519 may controller EM filter 518 to switch the desired ion species. For example, the EM filter and beam director may be synchronized to taster scan the beam to create a planar isotope junction. Alternately, the EM filter may be switched to generate successive graphene sheets of different isotope composition to create a vertical isotope junction.

These graphene regions can be doped with dopant atoms using different means. Doping is generally used to add excess electrons or electron holed to the materials. This will make the doped material a better or worse electrical conductor depending on dopant levels. Dopants might also be added interfere with phonon transport. For example, good thermoelectric materials are those that have good electrical conductivity, but poor thermal conductivity. Heat is transferred through the material either by electrons or phonons. If phonon transport can be inhibited, so can the heat transport.

The ion source 512 may include a small amount of dopant material that looks like the desired ion to the filter and thus is included as part of the selected ion beam that is directed towards the catalyst substrate. For example, a small amount of the 11B1H molecule could be included with a carbon source. If the filter is configured to pass ions having a mass number of twelve, 12C and 11B1H ions will be directed towards the substrate. The H atom will break away upon implantation leaving 11B dopant atoms in the 12C lattice. This is an effective approach for achieving uniform doping concentration. Alternately, a separate source of dopant ions may be provided and directed through the same filter. By controlling this source the dopant concentration can be varied or turned on and off entirely. A separate source 530 of dopant ions 532 and separate selection filter 534 can be used to dope the graphene with dopant atoms that do not have the same mass as the selected carbon isotope. If isotope selection of the dopant atoms is not required, the dopant source 530 can be directed at the substrate sans selection filter 534.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of making isotopically enriched graphene, comprising the steps of:
    (a) providing a catalyst substrate including a single crystal region on a surface of the substrate, said region having a hexagonal crystal lattice substantially lattice-matched to graphene;
    (b) providing a carbon ion beam source including a focusing aperture for generating a focused ion beam that is directed towards the substrate, said beam comprising a plurality of ion species, each species comprising a different electrically charged carbon isotope or a different electrically charged molecular ion containing one or more carbon isotopes;
    (c) accelerating the ion beam with an electric field towards the substrate;
    (d) using magnetic or electric field generating devices to separate the ion beam into a plurality of component ion beams according to the charge-to-mass ratio of the different ion species;
    (e) passing a selected component ion beam substantially comprised of a single ion species containing a single desired carbon isotope or molecular ion containing a single desired carbon isotope toward the substrate and filtering out the remaining component ion beams containing undesired ion species; and
    (f) directing the selected component ion beam onto the substrate to epitaxially grow isotopically-enriched graphene on the surface of the single crystal region of the substrate from the desired carbon isotope.

2. The method of claim 1, wherein the single desired carbon isotope is 12C, said isotopically-enriched graphene comprising at least 99.9% 12C.

3. The method of claim 2, wherein the focused ion beam comprises at most 99.1% 12C.

4. The method of claim 1, wherein the single desired carbon isotope is 13C, said isotopically-enriched graphene comprising at least 95% 13C.

5. The method of claim 4, wherein the focused ion beam comprises at most 2% 13C.

6. The method of claim 1, wherein the substrate has top and bottom surfaces, said desired carbon isotope implanted through the bottom surface to diffuse and exsolve carbon atoms from the interior of the substrate through the top surface to epitaxially grow the isotopically-enriched graphene on the top surface.

7. The method of claim 1, wherein first and second selected component ion beams each substantially comprised of different first and second carbon isotopes are directed toward the substrate to grow first and second regions of isotopically-enriched graphene that form an isotope junction between the different first and second carbon isotopes in one or more graphene sheets.

8. The method of claim 7, wherein the first and second regions of isotopically-enriched graphene are grown adjacent in a single graphene sheet to form the isotope junction within the single graphene sheet.

9. The method of claim 8, further comprising scanning the ion beam across the substrate while controlling the magnetic or electric field generating devices to first pass the first selected component ion beam to grow the first region and to then pass the second selected component ion beam to grow the second region.

10. The method of claim 7, wherein the different regions of isotopically-enriched graphene are grown in different graphene sheets to form the isotope between sheets.

11. The method of claim 10, wherein the ion beam from a single carbon ion beam source is separated into at least the first and second selected component ion beams, further comprising controlling said magnetic or electric field generating devices to first pass the first selected component ion beam to grow a first graphene sheet substantially from the first carbon isotope and then pass the second selected component ion beam is passed to grow a second graphene sheet substantially from the second carbon isotope.

12. The method of claim 10, wherein the substrate has top and bottom surfaces, said first and then said second selected component ion beams are directed toward the bottom surface to implant the first and then second desired carbon isotopes and then to diffuse and exsolve carbon atoms from the interior of the substrate through the top surface to epitaxially grow an upper graphene sheet from the first desired carbon isotope and a lower graphene sheet from the second desired carbon isotope on the top surface.

13. The method of claim 10, wherein the substrate has top and bottom surfaces, said first and seconded selected component ion beams directed towards the top and bottom surfaces, respectively, said first desired carbon isotope directly accumulating on the top surface of the substrate to epitaxially grow an upper graphene sheet, said second desired carbon isotope implanted through the back surface into the interior of the substrate and then diffusing and exsolving the top surface to epitaxially grow a lower graphene sheet.

14. The method of claim 7, wherein said first and second regions each comprise at least 95% of the first and second desired carbon isotopes, respectively.

15. The method of claim 7, wherein said first and second desired carbon isotopes are 12C and 13C, said first and second regions each comprise at least 99% 12C and 13C, respectively.

16. A method of making isotopically enriched graphene, comprising the steps of:
  (a) providing a catalyst substrate including a single crystal region on a surface of the substrate, said region having a hexagonal crystal lattice substantially lattice-matched to graphene;
  (b) providing one or more carbon ion beam sources, each source including a focusing aperture for generating a focused ion beam that is directed towards the substrate, said beam comprising a plurality of ion species, each species comprising a different electrically charged carbon isotope or a different electrically charged molecular ion containing one or more carbon isotopes;
  (c) accelerating the one or more ion beams with an electric field towards the substrate;
  (d) using magnetic or electric field generating devices to separate each of the one or more ion beams into a plurality of component ion beams according to the charge-to-mass ratio of the different ion species;
  (e) passing a first selected component ion beam substantially comprised of a single ion species containing a single first desired carbon isotope or molecular ion containing a single first desired carbon isotope toward the substrate and filtering out the remaining component ion beams containing undesired ion species;
  (f) directing the first selected component ion beam onto the substrate to epitaxially grow a first region of isotopically-enriched graphene on the surface of the single crystal region of the substrate from the first desired carbon isotope;
  (g) passing a second selected component ion beam substantially comprised of a single ion species containing a single second desired carbon isotope or molecular ion containing a single second desired carbon isotope toward the substrate and filtering out the remaining component ion beams containing undesired ion species; and
  (h) directing the second selected component ion beam onto the substrate to epitaxially grow a second region of isotopically-enriched graphene on the surface of the single crystal region of the substrate from the second desired carbon isotope,
  said first and second regions forming an isotope junction between the different first and second desired carbon isotopes in one or more graphene sheets.

17. The method of claim 16, wherein the first and second regions of isotopically-enriched graphene are grown adjacent in a single graphene sheet to form the isotope junction within the single graphene sheet.

18. The method of claim 16, wherein the different regions of isotopically-enriched graphene are grown in different graphene sheets to form the isotope between sheets.

19. The method of claim 16, wherein said first and second desired carbon isotopes are 12C and 13C, said first and second regions each comprise at least 99% 12C and 13C, respectively.

20. A method of making isotopically enriched graphene, comprising the steps of:
  (a) providing a catalyst substrate including a single crystal region on a top surface of the substrate, said region having a hexagonal crystal lattice substantially lattice-matched to graphene;
  (b) providing a carbon ion beam source including a focusing aperture for generating a focused ion beam that is directed towards the substrate, said beam comprising a plurality of ion species, each species comprising a different electrically charged carbon isotope or a different electrically charged molecular ion containing one or more carbon isotopes;
  (c) accelerating the ion beam with an electric field towards the substrate;
  (d) using magnetic or electric field generating devices to separate the ion beam into a plurality of component ion beams according to the charge-to-mass ratio of the different ion species;
  (e) controlling the devices to pass first and then second selected component ion beams, each selected component ion beam substantially comprised of a single ion species containing a single desired carbon isotope or molecular ion containing a single desired carbon isotope, said desired carbon isotopes being different in the selected component ion beams, and filtering out the remaining component ion beams containing undesired ion species; and
  (f) directing the first and then the second selected component ion beams onto a backside of substrate to sequentially implant the respective desired carbon isotopes into the interior of the substrate and then diffusing and exsolving through the top surface to epitaxially grow isotopically-enriched upper and lower graphene sheets from the respective carbon isotopes on the top surface of the single crystal region of the substrate to form an isotope junction between the upper and lower graphene sheets.

* * * * *